(No Model.)
J. L. BOGERT.
MANUFACTURE OF METALLIC TUBES.
No. 375,043. Patented Dec. 20, 1887.
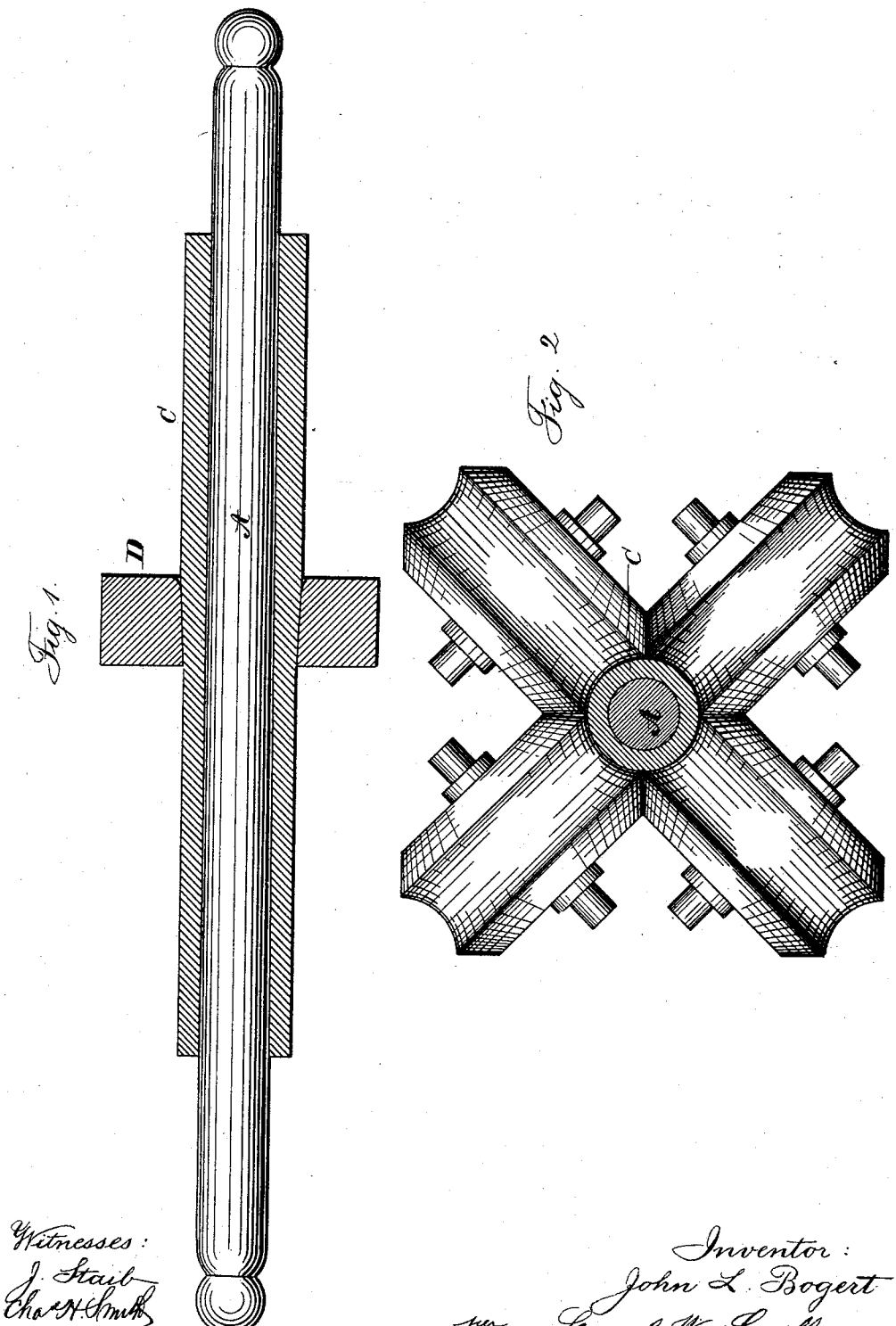
Witnesses:
J. Staib
Chas. H. Smith
Inventor:
John L. Bogert
per Lemuel W. Serrell Atty.

UNITED STATES PATENT OFFICE.

JOHN L. BOGERT, OF FLUSHING, NEW YORK.

MANUFACTURE OF METALLIC TUBES.

SPECIFICATION forming part of Letters Patent No. 375,043, dated December 20, 1887.

Application filed February 3, 1887. Serial No. 226,367. (No model.)

*To all whom it may concern:*

Be it known that I, JOHN L. BOGERT, of Flushing, in the county of Queens and State of New York, have invented an Improvement in the Method of Rolling Iron and Steel Pipe, of which the following is a specification.

This invention relates to the fabrication of tubular articles on a core or arbor.

There are three methods of making wrought-iron and also steel pipe now in general use—first, by welding together the edges of sheets previously rolled or drawn into a cylindrical form; second, by drawing a properly-shaped bloom or blank through drawing-dies on the draw-bench, and, third, by rolling the bloom or blank in properly-constructed rolls.

The product of the first method, in the nomenclature of commerce, is known either as "butt-welded" or "lap-welded" pipe, and exceeds in the amount and value of its annual output the results of all other processes combined.

The impracticability of welding the sheets around a mandrel or arbor, necessitating the successive use of dies and rolls, excepting in the case of certain sizes of butt-welded pipe, makes the process unsatisfactory. Furthermore, the welding of steel sheets into pipes has not heretofore been attended with very satisfactory results, as steel does not weld as easily as iron under ordinary conditions.

The second method is used for the finest kinds of wrought-iron pipe—those subjected to great bursting stresses. This process is rendered expensive by reason of the rapid deterioration of the dies, the excellent quality of the material required, and the slowness of the process as compared with the one previously described. Moreover, steel blooms or blanks, especially when made from cast ingots, are liable to contain blow-holes or cavities. These imperfections are not closed by the drawing-dies, but only elongated; hence this process is very limited in its application to the manufacture of steel pipe.

The third method has of late received considerable attention, and were it possible to overcome all the difficulties heretofore considered inseparable therefrom would be the most preferred.

In attempting to roll tubular blooms or blanks of steel or iron by passing them through the successive circular grooves of a "three-high" round-bar mill the result has been a failure, excepting where a central core of lime or other granular refractory substance has been made use of to preserve the circular form of the interior. Rolls with their axes of revolution inclined to one another at angles of ninety degrees and arranged in sets of four, or at angles of one hundred and twenty degrees and arranged in sets of six, have been used with more or less success. Central arbors of iron and also steel have been used on which to draw or roll pipes of lead, tin, &c. In these processes the difference in rates of expansion under changes of temperature of the arbor and the pipe has not been availed of in separating the pipe from the mandrel.

My invention consists in rolling the iron or steel or other tube upon a metallic arbor or mandrel whose coefficient of expansion is different and preferably greater than that of the pipe rolled, welded, or forged thereon. I make use of such a metal, alloy, or metallic substance for my core or mandrel as shall best meet the peculiarities of the pipe operated upon. Where high temperature can be used to advantage in the fabrication of the pipe, I make use of a metallic core or arbor which will not melt or weld at the temperature at which the pipe is being formed thereon, and, while possessing a coefficient of expansion as much greater than the material of pipe as shall be possible, yet possesses such cohesive strength, ductility, and malleability that the pipe and its core can be treated as a solid while at the temperature of the process, and the core or arbor may be readily withdrawn from the interior of the finished pipe without injury to the pipe when cold by suitable mechanical means by reason of the looseness between the pipe and its core or arbor occasioned by their not welding at the higher temperature of the process and by the greater contraction of the core or arbor than the pipe during cooling.

In the manufacture of wrought-iron or steel pipe, whether by welding, drawing, or rolling, I prefer to make use of a core or arbor of copper or a copper alloy. The reasons for this preference are that copper and its alloys expand and contract under the influence of heat and cold to a much greater degree than iron or steel. At the proper temperatures for rolling, forging, and welding iron or steel copper and its alloys show no welding affinity for iron or steel. Copper has a melting-point nearly as high as cast-iron, and nearly all its alloys possess high melting temperatures. Furthermore, copper can be rendered hard and brittle or soft and ductile by either working, heating and cooling, alloying, or annealing. The coefficient of expansion and contraction under heat and cold is not so great for copper and its alloys as for some other metallic substances, notably zinc, lead, tin, and their alloys; but the melting-points of these latter substances are too low, and they are unsuitable for use excepting at certain low temperatures. I desire to have it distinctly understood that I do not limit myself to mandrels of copper and its alloys alone, but use any rigid cohesive metallic substance whose coefficient of contraction in cooling is greater than that of the material of which the pipe is formed, and which can, furthermore, be removed in its entirety when cold from the interior of the pipe by suitable mechanical means.

In the drawings, Figure 1 is a longitudinal section of the tube and a cross-section of the drawing-die, the mandrel being in elevation; and Fig. 2 is a cross section of the tube and mandrel and an elevation of the wheels or rollers for reducing the pipe in thickness and elongating it.

The core or mandrel A is of copper or similar material, having a high coefficient of expansion and contraction under varying temperatures, the said core being greater in length than the iron or steel pipe when completed. It is to be cylindrical and of uniform size from end to end, or it may be prismatic when the bore of the pipe is not circular, and at the ends of the core are depressions or screws, so that such core may be grasped by suitable tongs or screwed into a head, and the core may be prepared with a coating of suitable refractory material, such as plumbago.

The ingot is to be tubular, and may be reduced and elongated to any desired extent by the action of rollers previous to the insertion of the core, the hole still being of a size for the copper core or mandrel to be inserted freely. When this is done the tube C, of iron, steel, or similar material, is to be of the proper temperature for the subsequent operations, which consist in drawing the tube and mandrel through a die, D, or passing the same through grooved rollers in three ranges, such as are used in rolling round bar-iron, or the tube and mandrel may be passed through between grooved rollers similar to those shown in Fig. 2, which are well known for drawing or rolling pipes or bars.

Under all circumstances the iron or steel tube is compressed and elongated by the action of the conical die or of the rollers, and the iron or steel tube is closed tightly upon the copper core, so that the interior of the tube is finished thereby.

In cases where this improvement is applied to lap-welded or butt-welded tubes the copper mandrel may be introduced when the welding takes place or afterward, as desired, the tube in all cases being compressed by rollers or dies upon the copper core. During these operations the copper core or mandrel becomes of the same temperature, or nearly so, as the iron or steel tube, and when the tube and core are allowed to cool the copper contracts to a much greater extent than the iron or steel, and hence becomes loose within the pipe, and it is preferable to immerse the core and pipe in oil, petroleum, or similar liquid, so that the same passes in between the core and pipe and becomes a lubricant to the core as it is withdrawn from the pipe, which operation is accomplished by seizing the core with suitable pinchers and drawing the same through a stationary die that holds back the pipe, as in ordinary draw-benches.

It is to be understood that the pipe is loosened from the core or mandrel by the differences of expansion and contraction of the different metals due to the difference in temperature when the pipe is being rolled or drawn and the temperature at which the pipe is removed from the core; hence in cases where the metal of the pipe expands to a greater extent than the metal of the core the pipe may be finished by drawing or rolling in a cold or nearly cold condition, and then warmed or heated previous to withdrawing the core from the pipe, and where the metal of the core expands to a greater degree than the metal of the pipe the latter may be stretched and loosened by warming or heating the core and pipe after the pipe has been rolled or drawn cold, or nearly so.

I claim as my invention—

1. The method herein specified of fabricating iron or steel tubes while in a heated condition, consisting in inserting a core or mandrel of copper or similar material having a greater coefficient of expansion than the metal of the tube, drawing or rolling the tube upon the core, allowing the core and pipe to cool and separate by the greater contraction of the core, and then pulling out the core, substantially as set forth.

2. The method herein specified of making seamless iron or steel tubes, consisting in rolling or otherwise working a tubular ingot, inserting into the same a core or mandrel of copper or similar material, and drawing, rolling, or otherwise working the tube to complete it, and allowing the tube and mandrel to cool and separate by the greater contraction of the mandrel, and then withdrawing such mandrel, substantially as set forth.

3. The method herein specified of making iron or steel tubes, consisting in rolling or drawing them in a properly-heated condition, inserting a mandrel of copper or equivalent metal, finishing the tube by rolling or drawing upon such mandrel, immersing the tube and mandrel in oil, petroleum, or other liquid to lubricate the mandrel, and withdrawing the mandrel after it has sufficiently contracted in cooling, substantially as set forth.

4. The method herein specified of making metallic pipe, consisting in fabricating the metallic pipe on the mandrel of dissimilar metal and applying heat, so as to cause the temperature of the pipe and core to change to loosen the pipe from the core, and then drawing the core out of the tube, substantially as specified.

Signed by me this 31st day of January, 1887.

JOHN L. BOGERT.

Witnesses:
GEO. T. PINCKNEY,
WILLIAM G. MOTT.